United States Patent [19]

Behr et al.

[11] 3,850,289
[45] Nov. 26, 1974

[54] CONVEYOR SYSTEM FOR CYLINDRICAL OBJECTS

[75] Inventors: R. Douglas Behr; Harold L. Hearns, both of Midland, Mich.

[73] Assignee: The Dow Chemical Company, Midland, Mich.

[22] Filed: Apr. 28, 1972

[21] Appl. No.: 248,697

[52] U.S. Cl. .................. 198/276, 198/22 R, 198/37
[51] Int. Cl. ............................................ B65g 47/24
[58] Field of Search ...... 198/26, 33 AA, 33 AB, 40, 198/45, 37, 102, 165, 220 BA, 22, 33 R, 32, 22 R; 221/13, 159, 157; 193/43 R, 43 D; 271/48, 49, 58, 59

[56] References Cited
UNITED STATES PATENTS

| | | | |
|---|---|---|---|
| 1,733,221 | 10/1929 | Fuller | 198/33 AB X |
| 1,803,689 | 5/1931 | Bernadt | 198/37 |
| 1,892,670 | 1/1933 | Jaeger | 198/26 X |
| 1,897,116 | 2/1933 | Friedman | 221/159 X |
| 1,970,574 | 8/1934 | Pelosi | 198/37 |
| 2,662,633 | 12/1953 | Kingsley | 198/37 X |
| 2,734,620 | 2/1956 | Fischer et al. | 198/45 |
| 2,816,646 | 12/1957 | Stocking | 198/165 X |
| 2,873,842 | 2/1959 | Erickson | 198/33 AB |
| 3,279,581 | 10/1966 | Drennan | 198/32 |
| 3,301,378 | 1/1967 | Wayne et al. | 198/220 BA X |
| 3,480,132 | 11/1969 | Tatibana | 198/220 BA |
| 3,603,446 | 9/1971 | Maxey et al. | 198/33 AB |

Primary Examiner—Richard A. Schacher
Assistant Examiner—Joseph E. Valenza
Attorney, Agent, or Firm—Burke M. Halldorson

[57] ABSTRACT

In a conveyor system for cylindrical objects, a gravity feed surface means is employed together with moving side rails or their equivalent, to organize such objects in a uniform manner as they proceed down the surface means. The system further contemplates such a surface means as a temporary, in-line storage section where the objects are permitted to back up, while being continuously biased forward by gravity; and in combination therewith, means for releasably retaining the objects against such bias to create a flow or stop condition as demanded by need; and most optimally, a sensing means for determining the amount of such back up for controlling the input of such objects to the surface means, and means for indicating the absence of objects in a critical area of the system, the operation of the retaining means between the flow and stop conditions being subject to such indicating means. Also disclosed in the combination, is an elevator means for lifting and transferring the objects between a series of two or more of such surface means.

16 Claims, 7 Drawing Figures

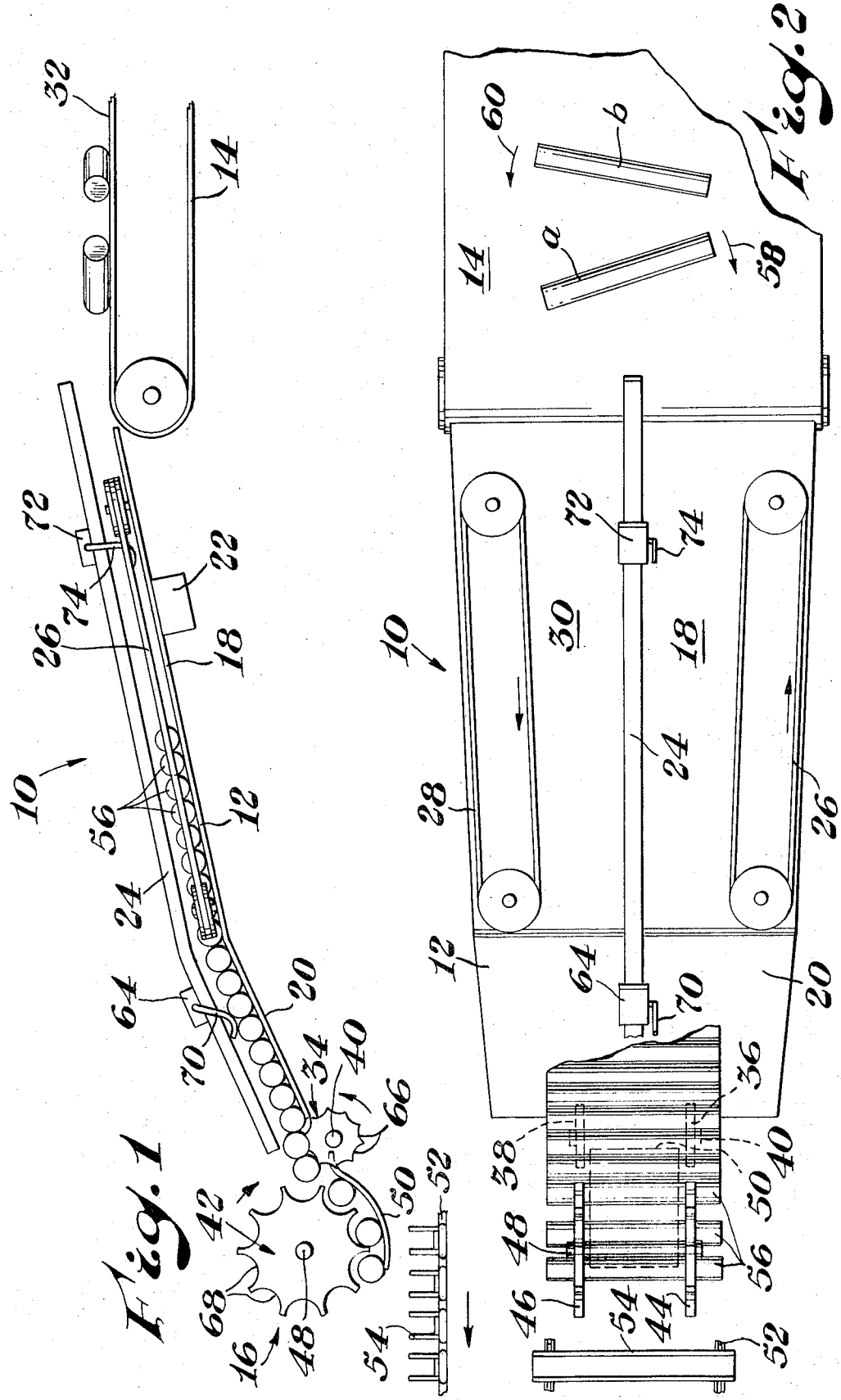

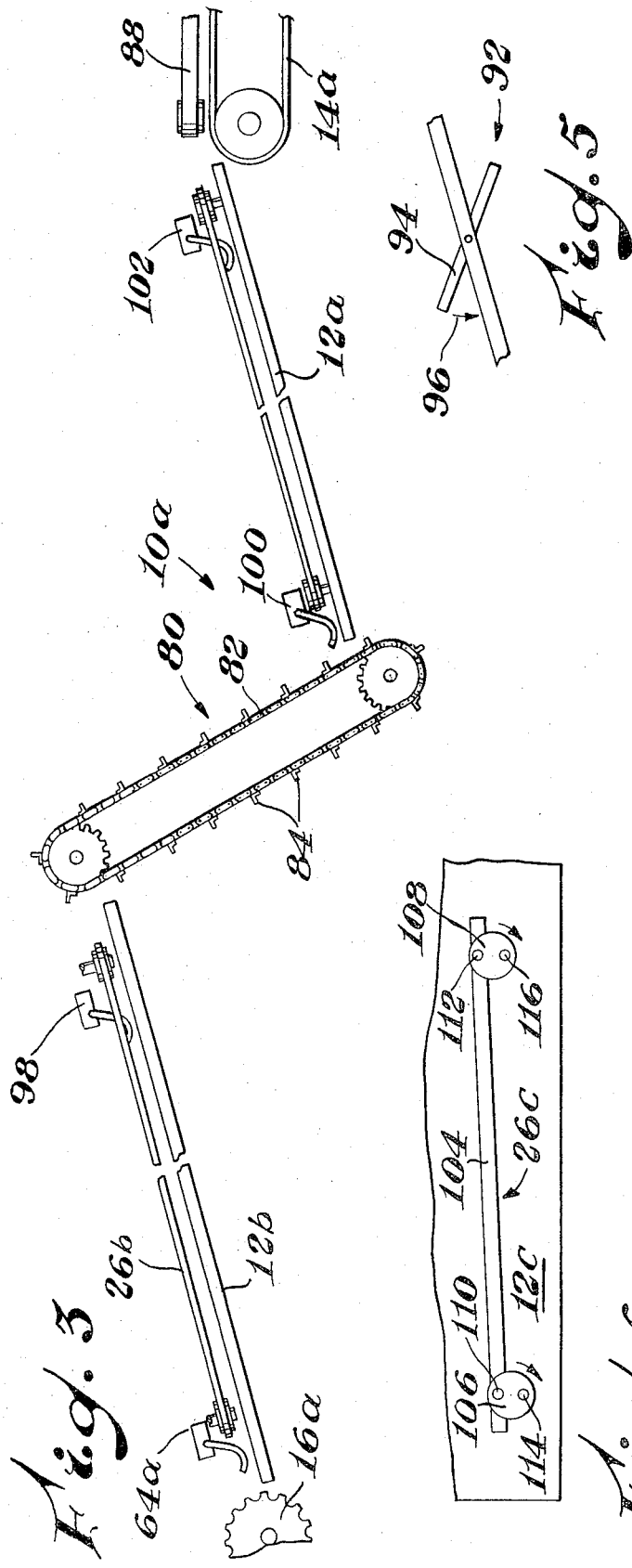
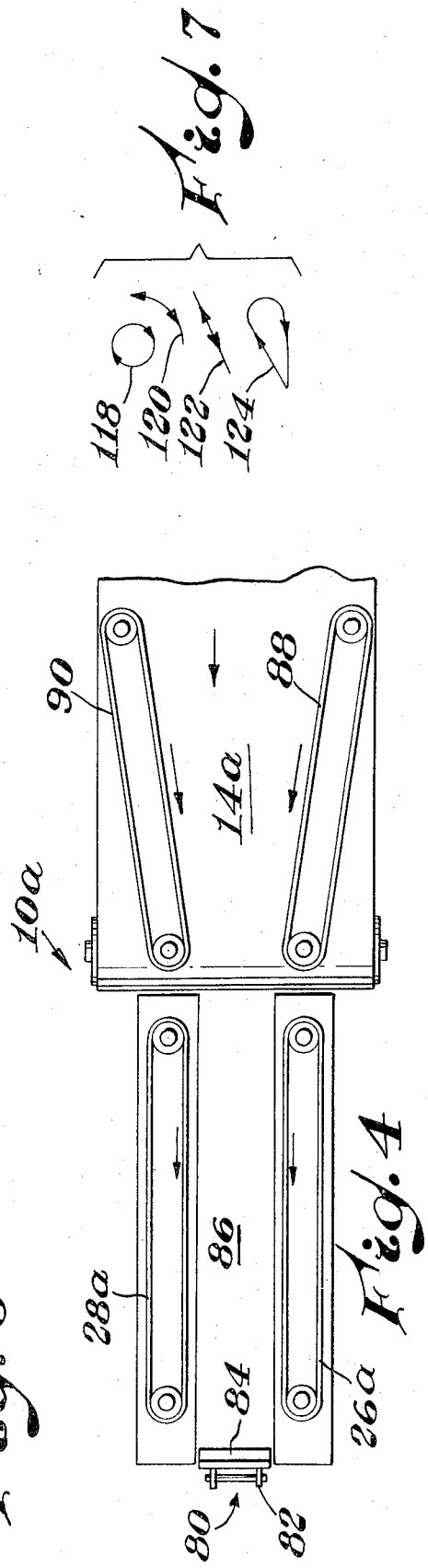

CONVEYOR SYSTEM FOR CYLINDRICAL OBJECTS

BACKGROUND OF THE INVENTION

In certain automated packing of cylindrical objects, as for example, rolls of household plastic film, there is need to synchronize the flow of the rolls to that of the cartons or the like in which such rolls are to be packaged. There is also a need to cause and maintain an axial alignment between the rolls and the cartons, and to erect and open the cartons prior to or simultaneously with the achievement of such axial alignment. By such manner, the rolls are placed in ready position to be stuffed or inserted automatically into the cartons at a rapid and efficient rate.

In order to achieve the proper orientation and flow rate, it is customary to utilize a standard conveyor belt, from which the rolls are transferred to a continuous assembly of side by side buckets, each of which receives a roll individually. The buckets ultimately move in synchronization alongside a series of moving and erected cartons, at which region the stuffing operation is culminated.

Part of such synchronization and flow control is perfected at the region of the bucket assembly. A remaining perplexing problem, however, is to control the flow and orientation of the rolls as they approach the bucket assembly. If the orientation is not right and generally uniform, the rolls do not readily accept automatic transfer to the buckets. Moreover, if the flow of the rolls is in excess of the capacity of the buckets, the rolls must somehow be retained without disturbing the uniform orientation thereof, or auxiliary means must be provided for restoring or causing a certain uniform roll orientation. Moreover, it is oftentimes desirable to build into the conveyance system, a temporary roll accumulating and storage section to insure a ready supply of rolls to the bucket assembly whenever needed.

A less than perfect earlier solution to this problem has been the use of what is generally referred to as a dead plate. Forward biasing means, such as parallel belts, are operated at a spacing approximately the height of the rolls above the dead plate. The rolls are retained on or permitted to flow from the dead plate responsive to the rotation and non-rotation, respectively, of a star wheel assembly. The latter ultimately transfers the rolls to the indicated bucket assembly. In the non-rotating condition, the star wheel serves as a stop means, and retains the rolls on the dead plate against the forward bias given thereto via the indicated biasing belts.

The prior art practice as exemplified generally above, has faults, particularly with tendency of the rolls to bunch up and bind between the moving belts and the dead plate. It also has tendency to skew the rolls such as where a roll comes into the biasing belts less than perfectly orientated, and thus does not engage all of the belts simultaneously. As a result, the rolls frequently come off the dead plate disorientated, or in some irregular fashion, and can thus bind or foul in the star wheel assembly, causing the possibility of a temporary shutdown.

Accordingly, it would be particularly advantageous if there were available to the art, a conveyor or transporting system which was capable of receiving a stream of rolls or like cylindrical objects, accumulate such rolls at some area in the conveyance line, in certain desired orientation, maintain a continuing forward bias thereon, and responsive to a need basis, stop or continue the forward movement of such rolls while controlling said orientation.

It would be particularly advantageous if there were a conveyor system which was capable of receiving a stream of non-uniformly orientated rolls or cylinders, align the same side by side along parallel axis, and, additionally, preferably such a conveyor system wherein the rolls would be permitted to accumulate without piggybacking or bunching up so that a system could be used to align the rolls, and thereafter to store and feed the rolls according to need requirements, and while maintaining sufficient uniform orientation among rolls to complement automatic handling thereof.

The aforegoing objectives of the invention and other related objectives thereof are accomplished in a conveyor system which includes as a basic element thereof, a gravity feed surface such as an inclined plane. In one embodiment, the gravity feed surface is bound by moving side rail means. Such combination is effective in establishing a certain uniform orientation among the conveyed rolls to facilitate their automatic and sure transfer to suitable receiving means, or for other automatic handling thereof. Additionally, the gravity feed surface, as constructed and employed herein, readily accepts back up of the rolls, without serious binding or fouling of the system. To this end, the gravity feed surface, together with companion elements including means for releasably retaining the rolls thereon, and for sensing the degree of roll back up, is used as a temporary in line storage section. The rolls are maintained in such storage in certain organization and with a continuing forward gravity bias thereon, for generally instant future transfer or flow thereof, as needed. A series of two or more of such surface means, connected by elevator means, is also disclosed.

The preferred embodiments of the present invention are shown in the accompanying drawings wherein wheresoever possible, like reference numerals designate corresponding materials and parts throughout the several views thereof in which:

FIG. 1 is a side elevational view, illustrating apparatus constructed according to the general teachings and principles of this invention;

FIG. 2 is a plan view of the apparatus of FIG. 1;

FIG. 3 is a view like FIG. 1 only showing a modified form of the invention;

FIG. 4 is a partial plan view of the apparatus of FIG. 3;

FIG. 5 is a partial side elevational view, illustrating an element which can be used in combination with the apparatus of the above figures;

FIG. 6 is a plan view of a modified moving side rail means applicable to the practice of the teachings herein, and FIG. 7 illustrates diagrammatically various repeating motions that can be followed by such moving side rail means as are contemplated generally in FIG. 6.

PREFERRED EMBODIMENTS OF THE INVENTION

Referring now to FIGS. 1 and 2 of the drawing, apparatus 10 shown therein comprises a centrally located gravity feed surface 12, preferably an inclined plane. The gravity feed surface extends forwardly and downwardly from adjacent the forwardmost end of an infeed conveying means, such as a moving conveyor belt 14. It terminates at its opposite end, adjacent a cooperating star wheel assemblage 16 of standard design. Gravity feed surface 12 can comprise sheet or plate metal and defines a first inclined portion 18 of uniform grade, and which extends forwardly until it merges with a second inclined portion 20. The latter is of a uniform, but somewhat steeper grade than the first inclined portion.

The gravity feed surface is rigidly mounted by suitable frame means, not shown, and is capable of vibratory motion supplied such as through a vibratory device 22 affixed to the underside of the first inclined portion. Such a device for representative purposes can comprise a standard magnetic vibrating motor.

A pair of cooperating moving side rail means 26 and 28 extend in opposed spaced apart relationship for substantially the entire extent of first inclined portion 18, and define therebetween a lane 30. The lane is in receiving communication with the upper run 32 of conveyor belt 14. Preferably such side rails comprise pulley driven belts, the inner runs of which converge inwardly toward each other in the forward direction. At all points, the moving side rails are spaced apart a distance at least slightly wider than the axial length of the rolls or like cylindrical objects to be transported by the system.

The star wheel assemblage comprises a first star wheel 34 comprising identical, star-shaped end members 36 and 38, spaced apart, and rigidly connected through an axle member 40. A second star wheel 42 of larger diameter is positioned in line with and behind the first star wheel; and similarly comprises star shaped end members 44 and 46, spaced apart, and rigidly connected through an axle member 48. A stationary curved retaining plane 50 is disposed underneath the second star wheel. Beneath the curved retaining plate, is a second continuous conveyor means 52 which carries a continuous series of spaced apart buckets 54, each of which is a dimension to individually contain a roll or cylindrical object of certain size.

A retaining bar or element 24 is positioned above the first and second inclined portions. The spacing between the bar and the inclined portions can be a constant slightly greater than the diameter of the rolls to be transported.

OPERATION

The operation of apparatus 10 is now described in reference to transporting rolls 56 of film, such as is used in the household for a variety of home uses. It will be understood, of course, that such apparatus in a like manner can transport any generally like cylindrical object for packaging thereof, or for other purpose as may be required by the art.

Such rolls can be brought into the system as a continuous or intermittent stream via the infeed conveyor belt 14, and are delivered in such condition onto lane 30 of gravity feed surface 12. Unless perfectly centered and orientated, each roll so delivered will eventually roll into one or the other of the moving side rails. For example, the roll designated as "a" on conveyor belt 14, will eventually run into the moving side rail 26, and on contact with the side rail, the trailing end of the roll will be angularly displaced forward, in this instance in the clockwise direction as shown by arrow 58. A roll "b" which is slanted oppositely, will in a similar manner engage the opposite side rail with like results, except that the angular displacement of roll "b" will be in the counter-clockwise direction, as shown by arrow 60. Thus, the system has the inherent advantage that non-perfectly orientated rolls, by virtue of their initial orientation on lane 30, will automatically select the side rail means which will tend to straighten out the roll.

Moreover, in the event the side rail means overcompensates, the roll is directed onto and selects the opposite side rail means, whereby the over-compensation is automatically tended to by the described apparatus.

Simultaneously, the rolls are, where necessary, laterally displaced as they move down lane 30, by means of the converging arrangement of side rail means 26 and 28. Generally, the more perfect the orientation of the roll, the faster the same will accelerate down lane 30. Thus, the slighter the effect will be on the roll, in the event the same contacts one or the other of the side rail means. However, if a roll is badly disorientated, it tends to accelerate more slowly. Accordingly, the system has the advantage that with a slow moving, badly disorientated roll, the angular displacement of the roll by the side rail means tends to be greater in degree. The system, therefore, is highly compatible with the function of aligning and properly laterally displacing rolls despite a condition of random or non-uniform orientation among the same.

The speed of the side rail means in relation to the grade of gravity feed surface 12, and the historically expected amount of misorientation among the rolls, as well as other pertinent variables as would have effect on the system, can be adjusted by trial and error procedure to determine the optimum operating parameters. By way of an exemplary illustration of such relationships, however, a first inclined portion 18 is constructed which descends at a uniform grade of 3 inches downwardly per foot horizontally forward, and the total length thereof is about 2 feet. The side rail means can be of similar construction to that shown, and converge from an initial spacing of about 15 inches down to about 12½ inches. The length of the inner run of each side rail means is about 2 feet. The speed of the side rail means is each approximately 175 feet per minute, and that of conveyor belt 14 is about 110 feet per minute. The belts at the indicated speed reliably and consistently handle rolls, of household polyethylene film, which vary in orientation from about perfect to about 30° off perfect. The specific rolls referred to are about 12 inches in length. Different roll sizes are tried in respective runs, and vary roughly in diameter from about 1⅞ inches to about 2¼ inches. Orientation that is perfect in the above sense means a roll aligned substantially normally to the longitudinal center line of lane 30. By handling, it is meant that such rolls, within the indicated misorientation range, can with good consistency, be conveyed by this system in a condition that promotes their reliable feed into the star wheel assemblage, the operation of which part of apparatus 10 will now be described.

Star wheels 34 and 42 are preferably operated continuously in synchronization with the speed of buckets 54, and are subject to clutching as controlled by a suitable switch or sensing means 64 located adjacent the upper extent of second inclined portion 20. The star wheels can each include the same number of indents or roll receiving cavities 66 and 68, respectively. Roll holding cavities 68 on the second star wheel are spaced apart generally identically with the spacing of buckets 54. The first star wheel receives the rolls from a supply of the same on the second inclined portion, and via a counter-clockwise rotation, transfers the rolls in closely packed relationship to the second star wheel, where the spacing between the rolls is conformed to the spacing of buckets 54. The second star wheel, with assistance from retaining member 50 transfers the rolls to the individual buckets, via clockwise rotation. The rolls are now ready to be stuffed into suitable containers such as open ended, erected cartons, by apparatus and methods well known to the art.

The star wheels and buckets are most expediently driven off a common drive, except as indicated, the star wheels are preferably subject to clutching as controlled by switch 64. For such purpose, the switch can include a pivotally movable arm 70 that is moved by each roll as it begins down the initial portion of the second inclined portion. The switch 64 automatically senses the presence or non-presence of rolls in this area of the second inclined portion by its pivotal motion to the left, occasioned by contact with the rolls. If, however, there is an absence of rolls coming off the first inclined portion, the switch assumes a rest position, and through a conventional time delay, such as 1 to 5 seconds, activates suitable clutching to stop the rotation of the star wheel assemblage. The buckets nevertheless continue to move.

However, in the event the packaging line forward of the star wheel assemblage is temporarily shut down for malfunction or other reason, such is customarily keyed to buckets 54 and the star wheel assemblage, thus shutting both down simultaneously. In such instance, the rolls are retained on the gravity feed surface by means of the first star wheel. The gravity feed surface serves as a temporary in-line storage section for such occasions, permitting the rolls to back up and accumulate, while at all times maintaining a forward gravity bias thereon, so that the rolls are instantly ready to be forwarded when the indicated common drive is reactivated. Such back up is permitted until the rolls reach a second switch or indicating means 72 located adjacent the upper extent of the first inclined portion. Switch 72 can similarly include a pivotable indicating arm 74, which responsive to pivotal inactivity, as caused by the back up of the rolls to the area of such pivot arm, shuts off the infeed conveyor belt 14, thus shutting off the further delivery of the rolls to the gravity feed surface.

Upon restarting of the common drive to the bucket chain and star wheel assemblage, the flow of the rolls off the gravity feed surface is resumed, provided switch 64 senses the actual presence of rolls on the second inclined portion. Such, in turn, operates indicating switch 72 to restart conveyor belt 14. Accompanying such restart, vibrator 22 is signaled by a suitable electrical connection or other means, to operate for a short duration. Such ensures that the backed up rolls promptly feed off the first inclined portion. The second inclined portion can be made sufficiently steep to negate the need or assistance of a vibrator to start the forward flow of rolls backed up thereon.

In the special condition of rolls partially or fully backed up into the area of the first inclined portion, incoming rolls are assisted in achieving the desired orientation by bumping into the retained storage of rolls; and this assists effectively in straightening the roll, which is further assisted by the next incoming roll, and so on. Thus, in instances where the incoming rolls are not permitted the full benefit of the side rail means, as in the back up condition, the need for the side rail means is nevertheless lessened, so that the system is highly insensitive to foul-up. Due to the spacing between the side rail means, the same can be operated continuously without need for clutching or other interruption.

The invention in a modified form is illustrated in FIGS. 3 and 4 as represented therein by apparatus 10a. Such apparatus includes an upwardly and forwardly moving elevator conveyor means 80, comprising a continuous sprocket driven chain 82. Attached to chain 82 is a series of roll carrying arms 84. Feeding into the lower extent of the elevator conveying means is a modified gravity feed surface means 12a, bound by moving side rail means 26a and 28a. A select out aperture or opening 86 is defined centrally in gravity feed surface 12a and can exist for the entire extent thereof. An infeeding conveying belt 14a is positioned in roll supplying relationship with gravity feed surface 12a. The latter is modified to include converging, moving side rail means 88 and 90 that are operated generally at the same speed as belt 14a. The side rail means 88 and 90 preferably comprise pulley driven belts.

A second gravity feed surface means 12b is in roll receiving relationship with the upper extent of elevator conveying means 80, and preferably includes moving side rail means, only one such rail means 26b being visible in the drawing.

If desired, the first and second gravity feed surfaces can be of sufficient slope or grade to negate the need for a second inclined portion or vibrator as used before, and, where necessary, can each include a roll slowing device 92, such as is shown separately in FIG. 5. The roll slowing device includes a pivoted plate 94 biased upwardly as shown in the drawing. The plate is balanced so that when it receives a roll, it pivots forwardly in the direction of arrow 96, permitting the roll to pass, but simultaneously slowing the roll.

A star wheel assemblage 16a, such as of a general design described hereinbefore, is located adjacent the lower part of the second gravity feed surface; and is operated as described earlier, including its being subject to clutching as controlled by a switch 64a. A retaining bar, such as shown before, can be used with each gravity feed surface to negate the possibility of piling of the rolls, where such is found to be a problem.

In operation of the modified embodiment, the rolls prior to being received by the first gravity feed surface means, are laterally displaced as they are conveyed forward on infeed conveyor belt 14a via the action of side rail means 88 and 90 associated therewith. By such manner, the rolls are approximately centered with gravity feed surface means 12a upon their delivery thereto. The rolls thereafter are angularly displaced and aligned as the same proceed down the first gravity feed surface means in the mode described above. For those rolls that are so badly misaligned that the same cannot be properly straightened by apparatus 10a, the same will not bridge across select-out aperture 86. Such rolls will thus drop through the select-out aperture, and therefore will not be conveyed further by this system, nor will they have a chance to later foul or bind in the system as they are automatically selected out. As is readily apparent, the select-out aperture can be readily sized and configured to pass only those rolls having a degree of mis-orientation capable of being corrected by the system.

The rolls at the bottom of the first gravity feed surface are subsequently transferred via the elevator conveyor means, to the second gravity feed surface means. The moving side rail means associated therewith, assist to retain the desired orientation among the rolls for proper feeding of the same to star wheel assemblage 16a. Responsive to clutching of the star wheel assemblage by switch 64a, or other stoppage thereof, the rolls can continue to back up until the same reach the position of a second switch 98, which shuts off elevator conveying means 80.

A third switch 100 is located adjacent the lower part of the first gravity feed surface means, and starts and stops the elevator conveyor means responsive to the presence or non-presence of rolls as described before, and is subject to the shut-off dominance of switch 98. A fourth switch 102 is located at the upper extent of the first gravity feed surface and shuts off the infeed conveyor belt 14a responsive to the back up rolls to the area of switch 102. Upon restarting the star wheel assemblage, rolls are taken off the second gravity feed surface means, whereby switch 98 indicates the "go" condition. Provided a suitable number of rolls are present on the lower part of the first gravity feed surface means, switch 100 also signals the "go" condition, and thus the elevator conveyor means is restarted. In turn, the flow of rolls from the first gravity feed surface means is sensed by switch 102, which signals conveyor belt 14a to restart.

A modified moving side rail construction is shown in FIG. 6 as designated therein by reference numeral 26c. In this instance the gravity feed surface 12c associated therewith, extends forwardly and downwardly in the left to right direction as concerns the orientation of the drawing. The side rail means 26c comprises a rigid bar or rail 104 rotatably attached adjacent its end to cams 106 and 108, respectively, such as at bearing points denoted at 110 and 112, respectively. The cams are rotatable about cam axis 114 and 116, respectively, which are offset from the indicated bearing points. Responsive to rotation of the cams in the clockwise direction, rail means 26c is stroked inwardly and forwardly; and then responsive to further rotation is returned for the next forward and inward stroke. The motion generated can be circular as schematically represented at 118 in FIG. 7. Illustrations 120–124 in FIG. 7 are exemplary or other motions such as can be repeated by a rigid side rail means in practicing the teachings hereof, utilizing of course suitable connections and drive means (not shown) affixed to and motivating the side rail means to result in such repeated motions. As may be well appreciated, the gravity feed surface means shown may be curved, for example, rather than comprising a flat inclined plane.

Accordingly, it is understood that the attached drawing illustrates preferred forms of the invention. Obviously various structural changes may be made therein without departing from the spirit and scope of the invention.

What is claimed is:

1. In apparatus for imparting alignment to a stream of uniformly sized objects of cylindrical shape, the combination comprising, a sloped surface means designed for gravity induced roll of such objects downwardly thereon, a pair of opposed, movable side rail means extending generally in the direction of slope of said surface means and defining therebetween a lane on the surface means through which said objects pass, said lane being wider than the axial length of said objects, means for delivering a stream of such objects to said surface means for roll of the same downwardly thereon and through said lane, said surface means being substantially level in the direction transverse to the direction of slope, whereby those objects properly centered on said lane, and which have an initial axial orientation normal to the direction of slope, may roll in a generally true and straight manner down said surface means without engaging either such side rail means, and further whereby those objects that have a skewed orientation, will by virtue of such orientation, select one or the other of said side rail means, and make contact therewith as the same pass through said lane, and means to move said side rail means in a manner whereby responsive to said skewed object making contact with that rail means as it has selected, its trailing end is displaced angularly forward thereby inducing an automatic straightening effect on such object.

2. The apparatus of claim 1 including an opening in such surface means for automatically selecting out objects too badly disorientated for straightening.

3. The apparatus of claim 1 wherein said side rail means are rigid.

4. The apparatus of claim 1 wherein said side rails comprise continuous belt means.

5. The apparatus of claim 1 including an elevator means located adjacent the lower extent of such surface means for lifting such objects upwardly therefrom.

6. The apparatus of claim 1 including a second such surface means, and an elevator means to assist transfer of such objects from adjacent the lower part of the first surface means to the upper part of said second surface means.

7. The apparatus of claim 1 wherein said surface means comprises an inclined plane.

8. The apparatus of claim 1 wherein a lower portion of such surface means is of steeper slope than a portion thereof located upwardly of such lower portion.

9. The apparatus of claim 8 including means adapted to intermittently vibrate said surface means.

10. The apparatus of claim 8 wherein said surface means comprises first and second inclined planes.

11. The apparatus of claim 1 including means adjacent the lower portion of the surface means for releasably retaining the objects thereon against the forward gravity bias imparted thereto by the surface means, to permit back-up of such objects on such surface means, and to permit flow of the objects from the surface means responsive to a need basis.

12. The apparatus of claim 11 including means for sensing the accumulation of such objects on the surface means, such sensing means controlling such delivery means responsive to the amount of back-up of objects on such surface means.

13. The apparatus of claim 12 including means to indicate a degree of presence or non-presence of objects on a lower portion of such surface means, the operation of such retaining means being subject to said indicating means.

14. The apparatus of claim 13 wherein said retaining means comprises a rotatable star wheel means adapted to convey such objects from said surface means in response to rotation, and to retain and accumulate such objects on such surface means in response to nonrotation thereof.

15. In a method of imparting generally uniform orientation to a stream of like sized cylindrical objects, the steps of: rolling said objects down a sloped surface means in a manner whereby the direction of roll of any certain such object will be determined according to the orientation of the object on such surface means, causing such rolling objects to pass through a lane of wider width than the axial length of such objects, said lane extending generally in the direction of slope and being defined by opposed side rail means, whereby those objects which are skewed so as not to roll substantially in a true downward direction will automatically select and roll against one or the other of said side rail means, and moving said side rail means in a direction and at a speed to cause the trailing end of the said skewed object to be displaced angularly forward upon contact with said rail means, thereby imparting an inherent straightening effect to said objects as they pass through said lane.

16. The method of claim 15 including the further step of restraining such objects adjacent the lower portion of the sloped surface means, to permit such objects to collect, and releasing and restoring such restraint to flow or stop the flow of such objects, as demanded by need.

* * * * *